United States Patent Office 3,605,590
Patented Sept. 20, 1971

3,605,590
ELECTRONIC SHUTTER FOR AUTOMATIC EXPOSURE CONTROL
Kiyoshi Kitai, 54 Tomihisa-cho, Shinjuku-ku, Tokyo, Japan
Filed Dec. 19, 1969, Ser. No. 886,526
Claims priority, application Japan, Dec. 20, 1968, 43/93,017
Int. Cl. G03b 7/08, 17/18
U.S. Cl. 95—10C          8 Claims

ABSTRACT OF THE DISCLOSURE

During an initial increment of movement of the operating member of an electronic shutter and before an exposure starts, an electric circuit senses the brightness of the subject to be photographed. If the brightness of the subject is too high or too low for satisfactorily taking a picture with the aperture that has been selected, further movement of the operating member is blocked and a corresponding lamp is lighted to indicate excessive or insufficient brightness. If the brightness is within allowable limits, movement of the operating member is permitted to proceed to make an exposure and a changeover switch operated by the operating member reconstitutes the circuit as a timing circuit to control the exposure time according to the brightness of the subject.

---

The present invention relates to electronic shutters for cameras.

With an electronic shutter, the exposure time is automatically controlled according to the brightness of the subject to be photographed. The camera may have provisions for selecting a diaphragm aperture in which case the aperture setting appropriately modifies the exposure time determined by the electronic circuit. However, in case the brightness of the subject is so high that for the aperture selected the required exposure time would be so short so as to exceed the electrical and mechanical performance of the shutter, or in case when the brightness of the circuit is so low that the exposure time would be longer than a camera can be held steady by hand, for example $\frac{1}{30}$ sec. it becomes impossible to get a good photograph because of the presence of exposure error in the first case, and because of camera vibration or movement in the long exposure time in the second case. Hence, if the photographer is not given a warning that the brightness of the subject is outside permissible limits, he may obtain a poor photograph or no photograph at all, thereby wasting film and perhaps missing an opportunity to photograph the subject, for example when he is traveling and does not have the film developed until his return home.

To avoid this disadvantage it has been proposed to provide the camera with an indicator, usually in the form of a lamp or a moving hand, to warn the photographer that correct light conditions do not prevail. However, such a warning may be overlooked with the result that an incorrect exposure is still made.

The present invention is directed to an electronic shutter which not only provides a warning that the brightness of the subject is excessive or deficient but also blocks the operation of the shutter so that an exposure is not made. Moreover, separate warning indications are given for excessive brightness and for deficient brightness respectively so that the photographer is advised accordingly and can make appropriate adjustment of the diaphragm aperture insofar as the range of adjustment of the aperture permits. Moreover, in accordance with the present invention a single relatively simple electric circuit serves sequentially as a sensing circuit and a timing circuit. Upon actuation of an operating member but before any exposure is begun, the circuit senses the brightness of the subject to be photographed and provides a suitable indication in the event the brightness is excessive or deficient. Moreover, it also controls suitable means for blocking further movement of the operating member to make an exposure in the event the brightness of the subject is either excessive or deficient. If the brightness is within suitable limits, continued movement of the operating member is permitted to initiate an exposure whereupon the circuit serves as a timing circuit to control the exposure time according to the brightness of the subject and the aperture that has been selected.

The nature and advantages of the invention will be more fully understood from the following detailed description of the construction and operation of a preferred embodiment of the invention shown by way of example in the accompanying drawings in which.

Figure 1:
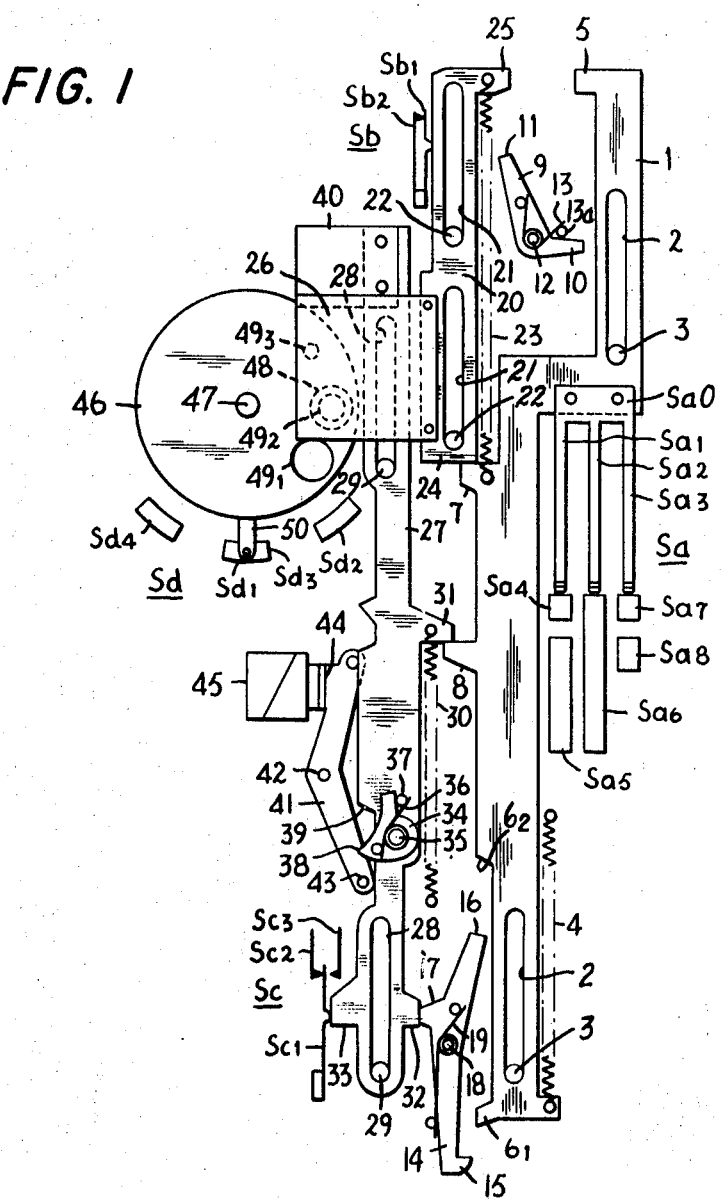
FIG. 1 is a schematic front view showing an electronic shutter in accordance with the invention in a state prior to operation to take a photograph.

The shutter mechanism illustrated in the drawings comprises an elongated operating member 1 which is supported for up-and-down movement by means of slots 2 and pins 3 fixed on a suitable support (not shown). The operating member 1 is biased in an upward direction by a tension spring 4. At its upper end the operating member 1 is provided with a laterally extending driving projection 5 adapted to cooperate with a release lever 9. Near its lower end the operating member 1 is provided with spaced steps $6_1$ and $6_2$ adapted to cooperate with a locking lever 14. Intermediate its ends the operating member 1 is provided with laterally extending projections 7 and 8 arranged to cooperate respectively with an exposure initiating member 20 and an exposure terminating member 27.

The operating member 1 also carries a three-pronged contact piece $Sa0$ of a changeover switch $Sa$. A first contact prong $Sa1$ is adapted to engage successively a short contact $Sa4$ and a longer contact $Sa5$ separated from one another by a gap. A second contact prong $Sa2$ is positioned to engage a contact $Sa6$ having a length corresponding to the sum of the length of the contacts $Sa4$ and $Sa5$ together with the intervening gap. A contact prong $Sa3$ is adapted to engage successively a short contact $Sa7$ corresponding in length and position to the contact $Sa4$ and a short contact $Sa8$ spaced from the contact $Sa7$ by a gap equal to that between the contacts $Sa4$ and $Sa5$. During downward movement of the operating member 1, the changeover switch $Sa$ is operative to change the function and mode of operation of the electric circuit as will be described below.

The release lever 9 is an L-shaped lever which is pivotally mounted on a suitable support (not shown) by a pivot pin 12 and is biased in a counterclockwise direction by a spring 13, one end of which bears on a fixed pin 13a which also serves as a stop limiting counterclockwise rotation of the lever. The upper end of an upwardly extending arm 11 of the release lever 9 is adapted to engage a lateral projection 25 of the exposure initiating member 20 when in the position shown in FIG. 2 to retain the member 20 against further downward movement. A laterally projecting arm 10 is in position to be engaged by the driving projection 5 of the operating member 1, when the latter has been moved downwardly a sufficient distance, to rotate the release lever 9 in a clockwise direction and thereby disengage the arm 11 from the projection 25 so as to release the exposure initiating member 20 for further downward movement.

The exposure initiating member 20 comprises an elongated member which is supported for up-and-down movement by guide grooves 21 and pins 22. It is biased to move downwardly by a tension spring 23 acting between a pin on member 20 and a pin on the operating member 1. The lower end 24 of the member 20 is thereby held against the projection 7 of the operating member 1 so that member 2 moves down with member 1 except when the operating member 1 is moved downwardly a predetermined distance and the member 20 is held against downward movement, for example by engagement with arm 11 of the release lever 9. The exposure initiating member 20 carries a laterally projecting shutter opening blade 26 which is adapted to cover a lens opening 48. A side edge of the member 20 is engageable with a movable contact S$b$1 of a timing switch S$b$ so as to hold it in engagement with a stationary contact S$b$2 and thereby keep the switch closed. When the exposure initiating member 20 moves downwardly past the position shown in FIG. 2 so as to initiate an exposure, it releases the movable contact S$b$1 so as to disengage the stationary contact S$b$2 by its inherent spring bias and thereby open the switch.

Figure 2:
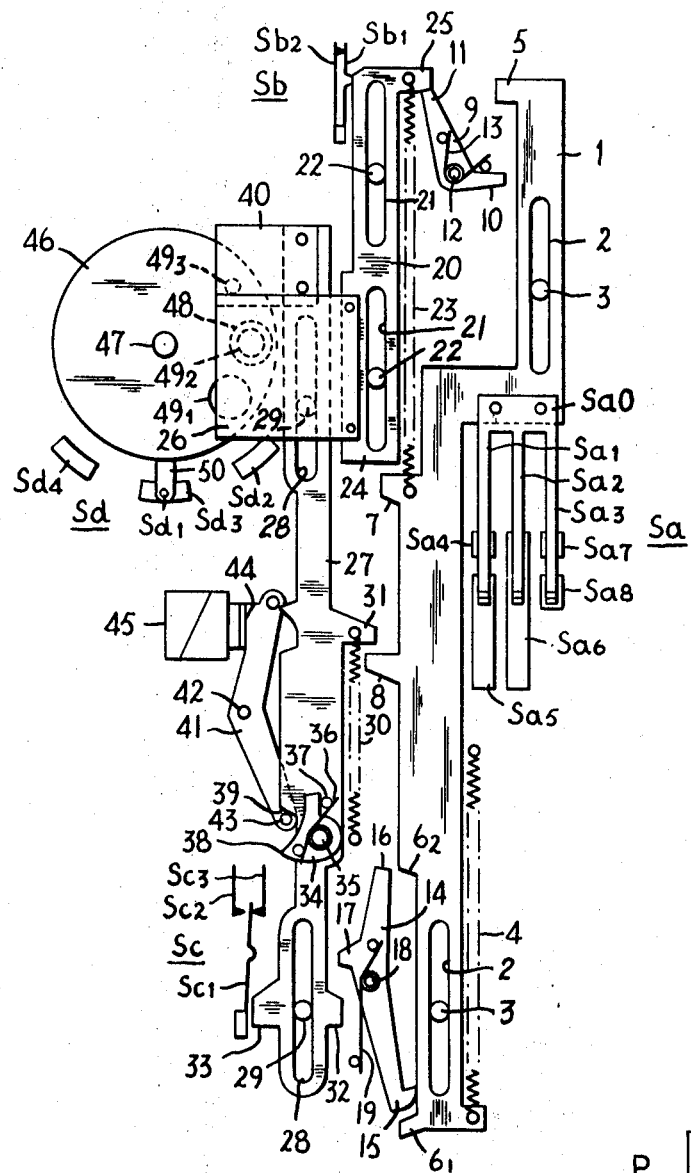
FIG. 2 is a similar view of the shutter at a state when the brightness of the subject has been sensed and found to be within permissible limits and just prior to the opening of the shutter.

The locking lever 14 is pivotally mounted intermediate its ends by a pivot shaft 18 and is biased in a counterclockwise direction by a spring 19. The position of the locking lever 14 is controlled by engagement of a lateral projection 17 of the locking lever with a cam projection 32 on the exposure terminating member 27. When the projection 32 engages the projection 17, the lever 14 is held in a position as shown in FIG. 1 in which a locking head 16 at the upper end of the lever is in the path of movement of the step $6_2$ of the operating lever 1 so as to engage this step and block further downward movement of the operating member. When the projection 32 is disengaged from the projection 17 the locking lever 14 is turned in a counterclockwise direction by its spring 19 to a position—as shown in FIG. 2—in which a hook portion 15 on the lower end of the lever 14 is in position to engage the step $6_1$ of the locking member 1 and thereby block further downward movement of the locking member.

The exposure terminating member 27 is an elongated member which is supported for up-and-down movement by guide slots 28 and guide pins 29. A tension spring 30 acting between a fixed pin and a pin on the exposure terminating member 27 biases the latter in a downward direction so as to keep the projection 31 in engagement with the projection 8 of the operating member so that member 27 moves down with member 1 except when the operating member 1 moves downwardly and the exposure terminating member 27 is held against downward movement. The above mentioned projections 31 and 32 are located on one side edge of the member 27 while on the opposite side edge there is a projection 33 adapted to engage a movable contact S$c$1 of a two-way indicator selecting switch S$c$ so as to hold the movable contact in engagement with a stationary contact S$c$2. When the projection 33 moves downwardly from the position shown in FIG. 1 to that shown in FIG. 2, the movable contact S$c$1 is released to move by its own bias into engagement with a second stationary contact S$c$3.

A stopping plate 34 pivotally mounted on the exposure terminating member 27 by a pivot shaft 35 is biased in a clockwise direction by a spring 36, one end of which bears on a fixed pin 37 which is also engageable with an arm of the stopping plate 34 to limit clockwise movement of the stopping plate. A nose portion 38 of the stopping plate 34 projects laterally beyond the adjacent side edge of the exposure terminating member 27 when the stopping plate is in engagement with the pin 37. The exposure terminating member 27 is further provided with a step 39 which is located a short distance above the projection 38 of the stopping plate. A shutter closing blade 40 is carried by the exposure terminating member 27 and projects laterally in position to close the lens opening 48 upon predetermined downward movement of the member 27. In the positions shown in FIGS. 1 and 2 the closing blade 40 is above and overlaps the opening blade 26.

A trigger lever 41 is pivotally mounted intermediate its ends on a pivot shaft 42. At its lower end the trigger lever 41 carries a pin 43 while at its upper end the lever carries the armature 44 of an electromagnet 45. When the electromagnet is energized so as to hold the armature 44 in engagement with the pole piece of the magnet, the lever 41 is held in a position in which the pin 43 is in the path of movement of the projection 38 of the stopping plate 34 and also in the path of movement of the step 39 in the side edge of the exposure terminating member 27 so as to hold the member 27 against further downward movement by its spring 30. When the electromagnet is deenergized the trigger lever 41 is free to turn in a clockwise direction from the position shown in FIGS. 1 and 2 and thereby permit passage of the projection 38 and the step 39. The stopping plate is rotatable in a counterclockwise direction against the action of its spring to permit downward movement of the pin 43 past it.

Suitable provision is made for selectively varying the size of the aperture for making an exposure. By way of example, there is shown a simple arrangement in which an aperture plate 46 rotatably mounted by means of a pivot shaft 47 is provided with a plurality of apertures $49_1$, $49_2$ and $49_3$ which can selectively be brought into registration with the lens opening 48 by rotation of the plate 46. It will be understood that a larger number of apertures may, if desired, be provided or other provision may be made for varying the aperture size as is well known in the art. An arm 50 on the aperture plate 46 carries a sliding contact S$d$1 which is engageable selectively with contacts S$d$2, S$d$3 and S$d$4 of an aperture selecting changeover switch S$d$ according to the position in which the aperture plate 46 is set.

Figure 3:
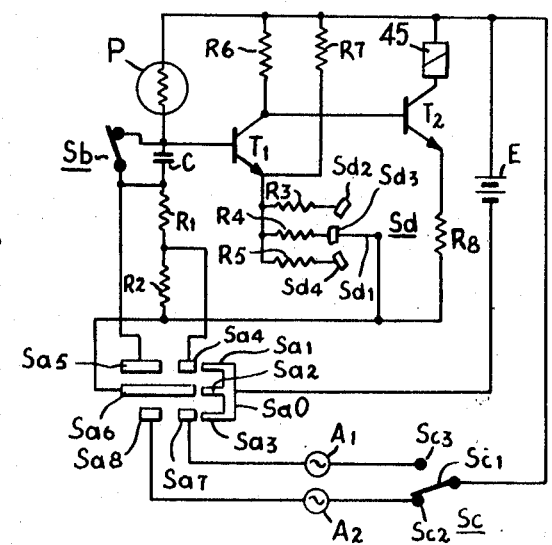
FIG. 3 is a wiring diagram including switches shown in a position corresponding to the state illustrated in FIG. 1.

In the control circuit shown by way of example in FIG. 3, a photoelectric element, for example a CdS photoresistor P, a capacitor C and comparison resistances R1 and R2 are connected in series, the other terminal of the photoelectric element P being connected to the positive terminal of an electric source E and the other end of resistance R2 being connected to the long contact S$a$6 of the changeover switch S$a$ and thus to the negative side of the electric source E through the contact S$a$1. A timing switch S$d$ connected in parallel with the capacitor C is also connected to the contact S$a$5 of the changeover switch S$a$. The connection between resistances R1 and R2 is connected to the short contact S$a$4 of the changeover switch S$a$.

The connection between the photoelectric element P and the capacitor C is connected to the base of a transistor T1, the emitter of which is connected to the positive side of the electric source E through an adjusting resistance R7 and is also connected to the long contact S$a$6 of the changeover switch S$a$ through one or another of resistances R3, R4 and R5 depending on the position of the changeover switch S$d$. The values of the resistances R3, R4 and R5 are selected according to the values of the corresponding aperture openings in the aperture selecting plate 46. The collector of the transistor T1 is connected to the positive side of the electric source E through a resistance R6 and to the base of a second transistor T2. The emitter of the transistor T2 is connected to the long contact S$a$6 of the changeover switch S$a$ through a resistance R8 while the collector is connected to the positive side of the electric source E through the electromagnet 45. The contact S$a$7 of the changeover switch S$a$ is connected to contact S$c$3 of the signal selection switch S$c$ through a lamp A1 for indicating excessive brightness of the subject. The contact S$a$8 of the changeover switch S$a$ is connected to the contact S$c$2 of the selection switch S$c$ through a lamp A2 for indicating deficient brightness. The movable contact S$a$1 of the selection switch S$c$ is connected to the positive terminal of the electric source E. The three-pronged movable contact S$a$0 is connected to the negative terminal of the electric source E.

OPERATION

Before an exposure is made, the aperture selecting plate 46 is rotated to bring an aperture of the desired size into registry with the lens opening 48. The aperture may be selected according to the experience of the photographer, the conditions under which the photograph is to be taken and the desired effect to be obtained. For example, if the subject is moving, a larger aperture may be selected in order to obtain a shorter exposure time. Conversely, if greater depth of field is desired, a smaller aperture may be selected. In FIGS. 1 and 2 the plate 46 is shown in position to select an aperture $49_2$ of intermediate size and accordingly the contact S$d$1 of the aperture selecting switch S$d$ is in engagement with contact S$d$3 to which resistance R4 is connected.

After the desired aperture has been selected an exposure is made by moving the operating member 1 downwardly from the set position shown in FIG. 1. An initial increment of movement brings the contact prongs S$a$1, S$a$2, S$a$3 of the moving contact S$a$0 of the changeover switch S$a$ into engagement with the contacts S$a$4, S$a$6 and S$a$7 respectively. The connection point between the resistances R1 and R2 is thereby connected to the negative terminal of the electric source E and also to the emitter of the transistor T1 through whichever resistance R3, R4 or R5 has been selected by the aperture selecting switch S$d$. The resistance R1 is thereby connected as a comparison resistance for the photoresistor P while the transistors T1 and T2 constitute an amplifying circuit. The circuit as thus connected functions as a detection circuit to determine whether the brightness of the subject to be photographed is within permissible limits, taking into account the aperture that has been selected, or is above or below such limits. Further operation of the shutter depends on the determination made by the detection circuit.

Excessive brightness

In case the brightness of the subject is so great that with the aperture value selected the exposure would be excessive even with the shortest exposure time at which the shutter mechanism is operable, the resistance of the photoelectric element P is lower than that of the comparison resistance R1, whereupon the transistor T1 becomes conductive while the transistor T2 becomes nonconductive so that the electromagnet 45 is not energized. As the exposure terminating part 27 continues to move downwardly with the operating member 1, the projection 38 of the stopping plate 34 engages the pin 43 of the trigger lever 41 but since the armature 44 is not attracted by the electromagnet 45, the lever 41 rotates freely to permit the continued downward movement of the member 27 so that the projection 32 disengages the projection 17 of the lock lever 14. The lock lever 14 is thereupon rotated in a counterclockwise direction by its spring 19 so that the hook portion 15 swings into the path of movement of the step $6_1$ of the operating member 1. Upon engagement of the step $6_1$ with the hook portion 15 of the locking lever 14, further downward movement of the operating member 1 is blocked at a point prior to opening of the shutter. Hence, an exposure with the incorrect light value is prevented.

At the same time, the descent of the exposure terminating member 7 disengages the projection 33 from the contact piece S$c$1 of the signal selecting switch S$c$ so that the movable contact S$c$1 disengages the contact S$c$2 and engages the contact S$c$3. The excess brightness indicating lamp A1 is thereby connected to the negative terminal of the electric source E through the switch S$a$ and to the positive terminal through the switch S$c$ and is hence lighted to indicate that the brightness of the subject is too great for the aperture that has been selected.

Normal brightness

If the brightness of the subject is within permissible limits for the aperture that has been selected, the resistance of the photoelectric element P is greater than that of the resistance R1 with which it is compared during the detection stage of operation and the transistor T1 becomes nonconductive while the transistor T2 becomes conductive. The electromagnet 45 is accordingly energized and attracts the armature 44 so as to hold the trigger lever 41 in the position shown in FIG. 1. Hence, when the projection 38 of the stopping plate 34 engages the pin 43 of the trigger lever 41 the pin cannot swing out of the way and hence downward movement of the exposure terminating member 27 is interrupted at a point where the projection 32 is still in engagement with the projection 17 of the locking lever 14. The hook portion 15 of the locking lever 14 is accordingly held out of the path of movement of the step $6_1$ so as to permit continued downward movement of the operating member 1.

As downward movement of the operating member 1 continues, the contact pieces S$a$1 and S$a$3 of the changeover switch S$a$ enter the gaps between the contacts S$a$4 and S$a$5 and between the contacts S$a$7 and S$a$8 respectively so that only the contact S$a$2 engages the long contact S$a$6. With this connection, the detection ciricuit is reconstituted so that the resistances R1 and R2 are connected in series as the comparison resistance of the photoelectric element P, the capacitor C continuing to be short-circuited by the timing switch S$b$. If the brightness of the subject is sufficient to make an exposure of a sufficiently short duration to permit hand holding of the camera—for example not greater than $\frac{1}{30}$ sec.—the resistance of the photoelectric element P is lower than the comparison resistance R1 plus R2 so that the transistor T1 becomes conductive and the transistor T2 becomes nonconductive so as to deenergize the electromagnet 45. The trigger lever 41 is thereby free to rotate so that the pin 43 can swing out of the way of the projection 38 of the stopping plate 34. The exposure terminating member 27 is thereby free to move downwardly under the force of its spring 30 until the projection 31 engages the projection 8 of the operating member 1. The projection 32 is thereby disengaged from the projection 17 of the locking lever 14 so as to permit the locking lever to swing in a counterclockwise direction. However, by this time the step $6_1$ of the operating member 1 is already below the position of the hook portion 15 so that downward movement of the operating member 1 is not interrupted. Moreover, the counterclockwise movement of the locking lever 14 moves the locking head 16 out of the path of movement of the step $6_2$ as seen in FIG. 2 so that the operating member can continue to move downwardly to effect an exposure.

Upon further desent of the operating member 1, the movable contacts S$a$1, S$a$2 and S$a$3 of the changeover switch S$a$ engage contacts S$a$5, S$a$6 and S$a$8 respectively. The photoelectric element P is thereby connected directly with the electric source E so as to decrease the base potential of the transistor T1 which thereby becomes nonconductive while transistor T2 becomes conductive to energize the electromagnet 45. The resulting attraction of the armature 44 to the electromagnet positions the pin 43 of the trigger level 41 in the path of the step 39 of the exposure terminating member 27 thereby impeding its descent as shown in FIG. 2. As the operating member 1 continues its descent, the contact between the movable contact S$a$3 and the contact S$a$8 of the changeover switch is interrupted. The driving projection 5 of the operating member engages the projection 10 of the release lever 9 to rotate the release lever in a clockwise direction and thereby free the exposure starting member 20 for downward movement by the pull of the spring 23. The opening blade 26 carried by the member 20 thereby moves downwardly so as to open the lens opening 48. At the same time the timing switch S$b$ is opened and the capacitor C begins to charge at a rate depending on the resistance of the photoelectric element P and hence on the brightness of the subject being photographed. When the capacitor C has been charged to a predetermined voltage depending on the setting of the aperture selecting switch S$d$, the transistor T1 becomes conductive and the transistor T2 accordingly becomes nonconductive to deenergize the electromagnet 45. The trigger lever 41 is thereby permitted to rotate in a clockwise direction to release the pin 43 from the step 39 and thereby permit the exposure terminating member 27 to descend rapidly so that the closing blade 40 closes the lens opening 48 to complete the exposure.

Resetting of the mechanism is effected by raising the operating member 1. By reason of the engagement of projection 7 with the lower end 24 of the exposure starting member 20 and engagement of the projection 8 with projection 31 of the exposure terminating member 27, both of these members are raised to the initial position shown in FIG. 1.

Deficient brightness

When the brightness of the subject to be photographed is so low that with the apertures selected, the exposure time that would be required would be longer than an exposure for which the camera can be held sufficiently steadily by hand, for example 1/30 sec., the resistance of the photoelectric element P is not only higher than the resistance of the comparison resistor R1 during the first detection stage but also higher than the resistance of the resistors R1 and R2 in the second stage of detection. Hence, the transistor T1 remains in a nonconductive state while the transistor T2 is in a conductive state. The electromagnet 45 is thereby kept energized to hold the trigger lever in a position in which the pin 43 engages the projection 38 of the stopping plate 34 and thereby blocks the exposure terminating member 27 after only a short downward movement. The projection 32 thereby remains in engagement with the projection 17 of the lock lever 14 to hold the lock lever in the position shown in FIG. 1 so as to block downward movement of the operating member 1 when the step 6$_2$ engages the locking head 16 of the locking lever 14. The making of an exposure is thereby prevented. In this position of the operating member 1, the movable contacts S$a$1, S$a$2 and S$a$3 of the changeover switch S$a$ engage contact points S$a$5, S$a$6 and S$a$8 respectively and switch S$c$ remains in the position shown in FIG. 3 so that the indicating light A2 is lighted to indicate a deficient brightness of the subject.

It will thus be seen that if the brightness of the subject is too high or too low, the operator is warned accordingly and moreover, the making of an exposure is prevented by blocking the movement of the operating member 1 before it reaches the point of initiating an exposure. In each instance the shutter mechanism can be reset by moving the operating member upwardly as described above. Instead of the operating member being biased upwardly and pressed downwardly as illustrated in the drawings, the direction of the bias can, if desired, be reversed so that the operating member is moved downwardly by a spring and lifted upwardly by hand to a set position where it is releasably held by a suitable catch. Still other changes can, if desired, be made in details of construction and operation of the shutter mechanism and circuitry.

What I claim and desire to secure by Letters Patent is:

1. An electronic shutter for automatic exposure control comprising an adjustable diaphragm aperture means, means for setting said diaphragm aperture means, an operating member movable for effecting an exposure, an exposure initiating member for opening said aperture, an exposure terminating member for closing said aperture, a control circuit comprising a photoresistor for sensing the brightness of a subject to be photographed, a comparison resistor, amplifying means, an electromagnet controlling the movement of said exposure terminating member, a changeover switch operable by movement of said operating member, alarm means for indicating insufficient brightness of the subject for the aperture set by said aperture setting means, alarm means for indicating excessive brightness of the subject for the aperture set by said setting means and an alarm selection switch operable by said exposure terminating member, said changeover switch having a first position in which said circuit is connected as a brightness detecting circuit to control said electromagnet in accordance with the brightness of the subject and thereby control the movement of said exposure terminating member and a second position in which said circuit is connected as a timing circuit to time the movement of said exposure terminating member to close the aperture, said exposure terminating member having a first position for indicating that the brightness of the subject is deficient, a second position for indicating that the brightness of the subject is excessive and a third position for terminating an exposure.

2. An electronic shutter according to claim 1, comprising means operable by the position of said exposure terminating member for blocking movement of said operating member before said operating member has moved far enough to effect an exposure in the event the brightness of the subject is excessive or deficient for the aperture set by said setting means.

3. An electronic shutter according to claim 2, in which said blocking means comprises a lever movable to block said operating member at one position in the event the brightness of the subject is deficient and in another position in the event the brightness of the subject is excessive.

4. An electronic shutter according to claim 1, in which said exposure terminating member is spring biased to move with said operating member when not impeded and in which means controlled by said electromagnet is operable to impede the movement of said exposure member when the brightness of the subject is deficient or excessive.

5. An electronic shutter for automatic exposure control comprising a shutter, an operating member movable for effecting an exposure, a control circuit comprising an electromagnet, a transistor controlling flow of current to said electromagnet, a photoresistor for sensing the brightness of the subject to be photographed, a capacitor, a comparison resistor, signal means for indicating insufficient brightness of the subject, signal means for indicating excessive brightness of the subject, a two-way selecting switch for energizing one or the other of said signal means and a changeover switch operable by movement of said operating member, said changeover switch having a first position in which said photoresistor and said comparison resistor are connected as a brightness detection circuit to energize said insufficient brightness signal means if the brightness of the subject as sensed by said photoresistor is insufficient and to energize said excessive brightness signal means if said brightness is excessive, means controlled by said electromagnet for blocking continued movement of said operating means if the brightness of the subject is excessive or insufficient, and said changeover switch having a second position to which it is moved by said operating means if not blocked in which said photoresistor is connected with said capacitor to constitute a timing circuit, means controlled by said operating member for opening the shutter and means including said electromagnet controlled by said timing circuit for closing the shutter after a time interval dependent on the brightness of the subject as sensed by said photoresistor.

6. An electronic shutter according to claim 5, further comprising means for controlling the aperture size for an exposure, said circuit including means controlled by the aperture size for modifying the brightness sensing function of said circuit when said changeover switch is in said first position and for modifying the timing function of said circuit when said changeover switch is in said second position.

7. An electronic shutter according to claim 5, in which said means for closing the shutter comprises a movable exposure terminating member, and in which said means for blocking said operating member comprises a blocking lever actuated by said exposure terminating member and engageable with said operating member.

8. An electronic shutter according to claim 5, further comprising a trigger lever actuated by said electromagnet and controlling movement of said exposure terminating member.

References Cited
UNITED STATES PATENTS

| | | | |
|---|---|---|---|
| 3,416,421 | 12/1968 | Biedermann et al. | 95—10(C) |
| 3,442,190 | 5/1969 | Erickson | 95—10(C) |
| 3,460,450 | 8/1969 | Ogihara | 95—10(C) |

SAMUEL S. MATTHEWS, Primary Examiner

J. F. PETERS, Jr., Assistant Examiner

U.S. Cl. X.R.
95—53EL